United States Patent [19]

Dlugos

[11] Patent Number: 4,506,330

[45] Date of Patent: Mar. 19, 1985

[54] ELECTRONIC MAILING APPARATUS AND METHOD

[75] Inventor: Daniel F. Dlugos, Huntington, Conn.

[73] Assignee: Pitney Bowes Inc., Stamford, Conn.

[21] Appl. No.: 395,398

[22] Filed: Jul. 6, 1982

[51] Int. Cl.[3] .............................................. G06F 15/20

[52] U.S. Cl. ........................................ 364/466; 177/4; 177/25; 235/61 PS; 364/567

[58] Field of Search ........................ 364/466, 467, 567; 177/3, 4, 5, 25; 235/61 PS

[56] References Cited

U.S. PATENT DOCUMENTS

| | | | |
|---|---|---|---|
| 3,635,297 | 1/1972 | Salava | 364/466 X |
| 4,320,461 | 3/1982 | Dlugos | 364/466 |
| 4,420,819 | 12/1983 | Price et al. | 364/466 X |
| 4,430,716 | 2/1984 | Dlugos et al. | 364/466 |

*Primary Examiner*—Felix D. Gruber
*Assistant Examiner*—Kevin J. Teska
*Attorney, Agent, or Firm*—Robert H. Whisker; Albert W. Scribner; William D. Soltow, Jr.

[57] ABSTRACT

An improved electronic mailing apparatus and method is disclosed which provides customized zip to zone data reflecting variations in postal cost for a particular class of postal service. The apparatus includes a first memory means for storing standard zip to zone conversion data for existing, standard zip to zone conversion tables. A second memory means is provided for storing custom zip to zone conversion data for only a limited number of conversion tables. The custom data reflects postal cost variations in a particular class. A manually actuated switching means is provided for selectively addressing a memory sector of the second memory means. This sector stores custom conversion data for zip to zone conversion table corresponding to the zip code area where the meter is located. Memory requirements for custom data storage are thereby substantially reduced.

10 Claims, 7 Drawing Figures

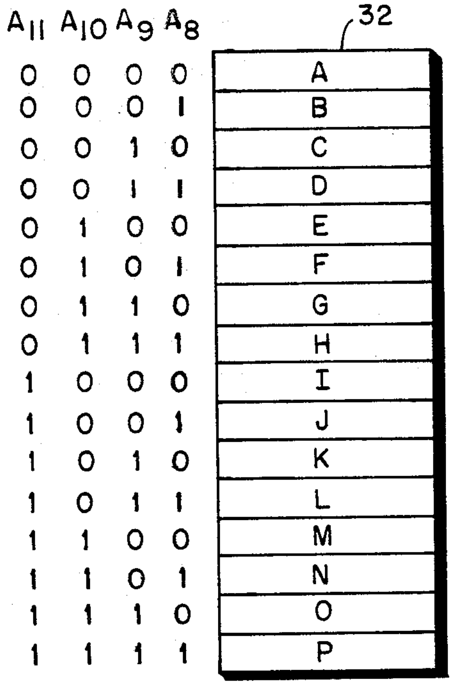
FIG. 5
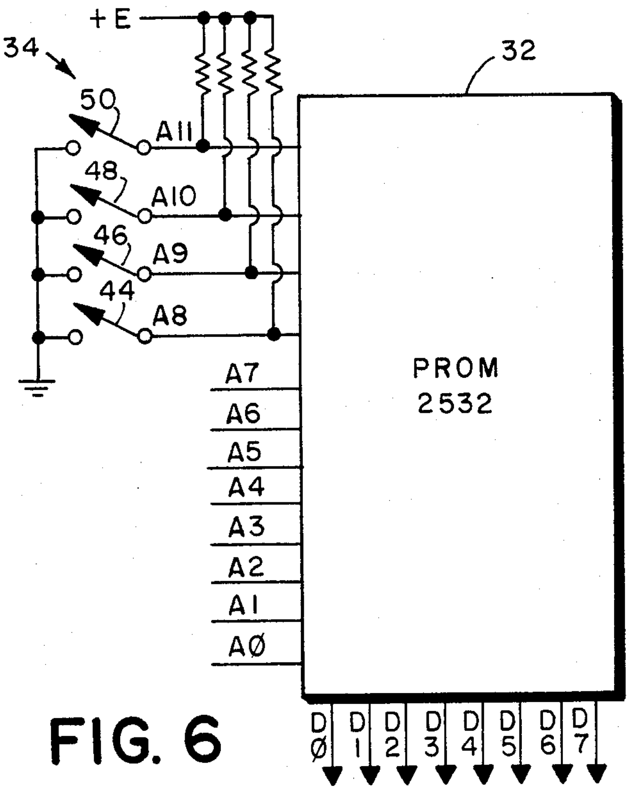
FIG. 6
FIG. 7
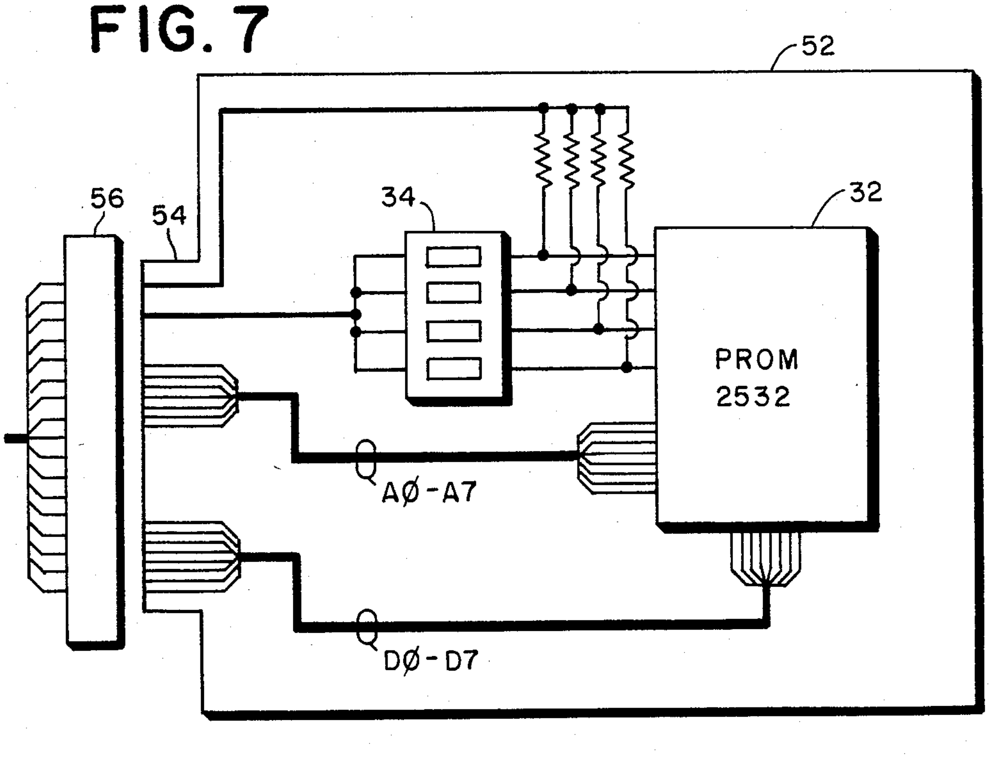

ELECTRONIC MAILING APPARATUS AND METHOD

BACKGROUND OF THE INVENTION

1. Field of the Invention

This invention relates generally to electronic mailing systems. The invention relates more particularly to an improved electronic mailing apparatus and method for determining postage for variations within a class of postal service.

2. Description of the Prior Art

Various systems have been provided for automatically calculating postage. These systems in general make use of electronic computational techniques. One such system to which the present invention pertains is disclosed in U.S. Pat. No. 4,286,325 which is assigned to the assignee of this invention. In the system disclosed in the aforementioned patent, postage for each class of domestic service is automatically determined on the basis of the particular class of service, the destination zone and the weight of a parcel being mailed. Other factors are also automatically accounted for, as for example, over-sized parcels, over-weight parcels, etc. The system includes a scale means which provides a digitally encoded indication of the weight of the parcel, a user terminal means for manually entering the desired class of service and destination zip code, a memory means for storing program and postage rate information, and a processor which intercouples the scale, terminal and memory means to provide calculated postage for the parcel. The postage amount thus determined is displayed and, when desired, is automatically printed.

With a selected class of service and a predetermined parcel weight, the variable which controls the domestic postage charge is the destination zone. The U.S. postal service has established eight destination zones each of which encompasses a predetermined range of geographical distances from the point of origin of the parcel being mailed. For example, a zone 3 range of distances encompasses 151 to 300 miles from the point of origin, a zone 5 range of distances encompasses 601 to 1,000 miles from the point of origin, etc.

Parcel handling and processing is facilitated by the familiar use of zip code numbers, each of which is associated with a particular geographic location in the United States. Generally speaking, the average user of the United States postal service is more familiar with zip code usage than zone distances. Accordingly, in order to facilitate a determination of the destination zone from a knowledge of the destination zip code, the United States postal service has established zip code to zone number conversion tables. Each such table in unabridged form may include up to, but generally less than, 256 destination zip code to destination zone number conversions. One such conversion table is required for a limited area of originating zip codes. In practice approximately 600 such tables are employed to cover existing originating zip codes in the United States. By referring to the appropriate originating zip code table, the user can readily locate the destination zip code and he will learn the corresponding destination zone. Having thus learned the destination zone number, the user need only enter a postage table for the desired class of service with the known parcel weight to determine the established postage. It is apparent that the use of zip to zone tables thus facilitates manual postage computation.

The electronic mailing system disclosed in the aforementioned patent automatically performs this operation. It includes stored data in its memory means which encompasses some of the aforementioned zip to zone conversion tables. While a relatively large storage capacity would be required to store the data for 600 standard/express conversion tables, the storage requirements for a system at a particular location have been reduced by storing a limited number of conversion tables including the tables for the system locale and by providing selective switching means for indicating the storage table associated with the geographic locale of the system. In operation, the user of the existing system disclosed in the aforementioned patent makes a keyboard entry of the first three digits of the destination zip code and the processor, through a predetermined routine, obtains the destination zone from the stored zip to zone conversion tables and automatically uses the zone thus found in computation of the postage.

The postage for fourth-class service is computed on a zone and weight basis as indicated hereinbefore. In establishing zone costs for fourth-class service, the United States postal service has geographically divided the United States into a number of bulk mailing centers (BMCs). In practice, fourth-class mail is routed from a point of origin to the nearest BMC, from this nearest BMC to the destination BMC, and thence from the destination BMC to a destination address. Fourth-class zone rates reflect this BMC form of parcel handling. However, there are occasions when both the destination address and point of origin are located in an area encompassed by the same BMC. In such case, transportation from the originating BMC to the destination BMC is unnecessary and associated handling is avoided. Under these circustances, the postage for intra-BMC mailing is less than the fourth-class postage as reflected in the zone distance costs for fourth-class service and represents a variation from the cost of fourth-class service as determined on the basis of weight and zone distance.

It would be beneficial to provide a method and apparatus for use with an electronic mailing system of the type disclosed in the aforementioned patent which reflects a reduction in postage for intra-BMC parcel handling. It would also be beneficial to provide a method and apparatus for use with systems of the type disclosed in the aforementioned patent which adapts such existing systems to reflect the reduced postage for intra-BMC parcel handling. While such a system may be provided through the use of a separate zip to zone conversion table, it would be relatively costly and complex to provide a separate storage means for each of the approximately 600 separate conversion tables.

SUMMARY OF THE INVENTION

Accordingly, it is an object of this invention to provide an improved electronic mailing apparatus and method for automatically calculating postage for parcels mailed between locations within a same bulk mailing center.

Another object of the invention is to provide an electronic mailing apparatus and method for calculating intra-BMC postage and which utilizes zip code to zone number conversion tables having reduced storage requirements.

Another object of the invention is to provide a means for economically adapting an existing electronic mailing system of the type described for the calculation of intra-BMC postage.

Another object of the invention is to provide a means for economically accounting for postage variations within a particular class of service.

A further object of the invention is to provide an improved form of electronic mailing system.

In its general aspects, the apparatus of the present invention, in addition to having a first memory storage means for storing zip to zone conversion table data for various classes of postal service, also provides a second memory storage means for storing custom zip to zone conversion table data for a particular class of service.

In accordance with more particular features of the invention, an electronic mailing apparatus is provided having a scale means, a terminal means, a memory means and a processor means for intercoupling the scale, terminal and memory means to provide an indication of postage. The memory means includes a first storage means for storing zip to zone conversion table data for existing, originating zip code locations in the United States and which tables can be used with various classes of postal service. The memory means further includes a second memory storage means for storing custom zip to zone conversion table data which tables are associated with a particular class of service. This is accomplished in one embodiment by the use of one of a plurality of alternative memory storage members, each one of which is adapted to store data associated with a limited number of custom zip to zone conversion tables. A manually actuated switching means is provided for selectively addressing the one of said conversion tables associated with the zip code location of the apparatus.

In accordance with more particular features of the apparatus of the invention, the memory storage members comprises a PROM having a plurality of memory sectors. Each of said sectors stores custom data associated with a zip to zone conversion table for a particular class of postal service and for a particular zip code originating area. The switching means is manually selectable for addressing one of a plurality of the memory sectors thus enabling the storage member to provide conversion table data for a limited number of originating zip code locations. In a preferred embodiment, a PROM storage member is mounted on a demountable circuit board along with the manually actuating switching means.

The use of custom data provides zip to zone conversion reflecting postal cost variations within a particular class of service. The custom data can apply to fourth-class U.S. postal service and include data reflecting reduced intra-BMC postage costs, United Parcel Service specialized class, etc.

The total number of alternative storage members provides a storage capacity for storing the existing custom zip to zone conversion tables of the entire United States. In a particular example, a 4,000 word PROM storage member will store approximately 16 separate, custom zip to zone conversion tables. Forty such alternative PROMS, provides custom zip to zone tables for the entire United States. The user need use only the one storage member PROM which includes his originating zip code area.

The method of the invention provides for the steps of determining the weight of a parcel, determining the class of service, searching a first zip to zone conversion table when said postal class is of a first class and alternatively, searching a custom zip to zone conversion table when said postal class is a second particular class; and, determining and indicating the postage for said parcel from said weight, class and zone information.

BRIEF DESCRIPTION OF THE DRAWINGS

These and other objects and features of the invention will become apparent with reference to the following specification and to the drawings wherein:

FIG. 6 shows switching circuitry connected to the high order address bits of a PROM in accordance with the subject invention.

FIG. 7 shows the physical arrangement of components, including the PROM and the switching circuitry, on a removable board.

DETAILED DESCRIPTION

Figure 1:
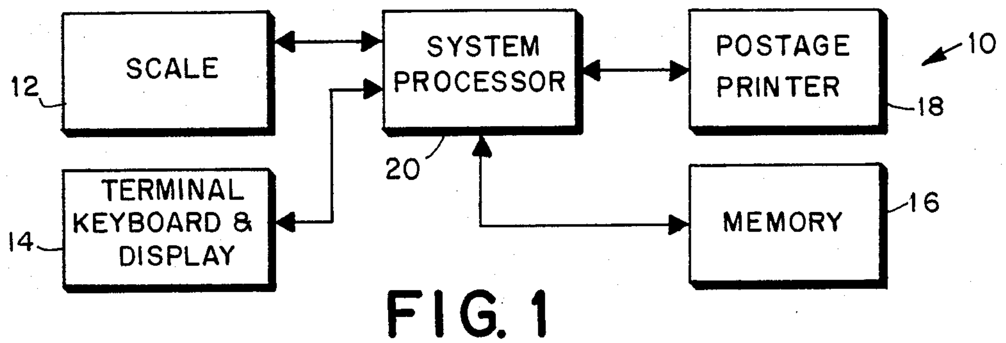
FIG. 1 is a diagram, in block form, of an electronic mailing system constructed in accordance with features of this invention.

Referring now to FIG. 1 of the drawings, there is illustrated in block diagram form an electronic mailing apparatus 10 which comprises a scale means 12, a terminal 14, a memory means 16, a postage printing means 18, and a system processor means 20. Scale means 12 is adapted to receive a parcel being shipped, to sense the weight of the parcel and to provide in electrical digital format an indication of the weight of the parcel. Terminal 14 includes a keyboard and visual display. The keyboard enables a user to manually enter the desired class of postal service, the destination zip code, special fees and the like. In general, the first three digits of the destination zip code are entered. The postage printing means 18 is adapted to print postage value for a parcel which is calculated by the apparatus 10. The memory means 16, which is described in greater detail hereinafter, stores program and operating data. System processor 20 intercouples the scale, terminal, memory, and postage printing means to determine and, when desired, print the postage amount for a parcel being shipped. The determination of postage for domestic U.S. Postal Service is based on the weight of the parcel, the class of service and the destination zone.

Memory means 16 employs an 8 bit word which is referred to generally as a storage byte. These words may be encoded in various formats. The most common format divides each word into two, four-bit bytes, each of which is encoded in hexadecimal (base 16) format. In certain flag words, specific bytes are interpreted as having specific meanings depending on their binary value. The flat words are microinstructions which define portions of a chart in which they appear or control postage computation or printing steps.

Figure 2:
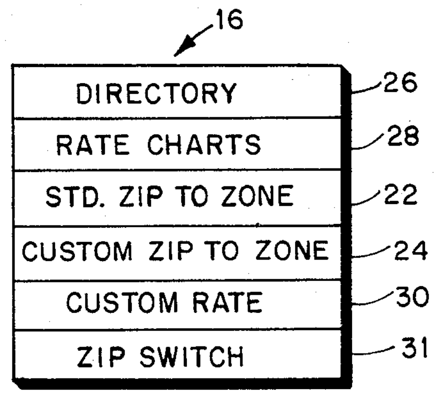
FIG. 2 is a schematic representation of the information stored in memory.

Memory means 16 includes a first storage means 22 (FIG. 2) for storing standard, zip to zone conversion tables. The expression "standard" refers to the zip to zone conversions presently adopted by the United States postal service for its various classes of postal service. The standard conversion table memory storage requirements are satisfied by the use of a set of alternatively, pluggable PROM boards, each PROM board in the set having a PROM adapted to store a plurality of standard zip to zone conversion tables and express mail tables in different storage sectors of the PROM. One such pluggable PROM board is utilized at any one time in the first memory means 22. A switching board means 31 is provided and includes a multiposition switch which is preset to indicate the particular PROM storage sector of the first memory means 22 which stores the standard conversion table for the geographic locale of the system. In one arrangement not deemed limiting of the invention in any respect, the set comprises about eighty two alternatively, pluggable PROM boards, each including a PROM having a two thousand word storage capacity and adapted to store about twelve standard/express conversion tables. Memory means 16 further includes a second memory storage means 24 for storing custom zip to zone conversion tables. The custom zip to zone data reflects modifications to the conversion tables which take into account the varying rate for a particular service, such as a reduced rate for intra-BMC mailings. The second storage means 24 provides for storage of a limited number of conversion tables, as indicated in greater detail hereinafter, but which includes the conversion table for the zip code area at which the apparatus 10 is located. Memory 16 further includes a storage means 26 for storing a system directory table, a storage means 28 for storing rate charts for the various classes of service and storage means 30 for storing custom rate data. Generally speaking, the memory 16 comprises a number of PROMS having a capacity sufficient to store the aforementioned data.

Figure 3:
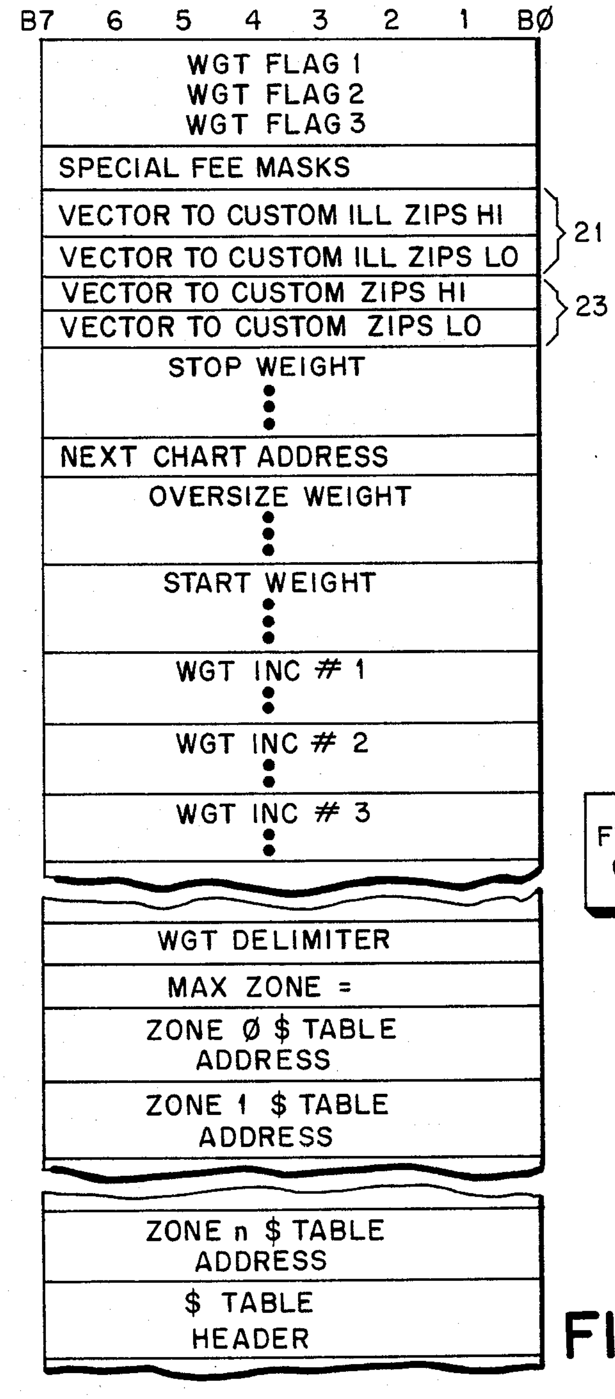
FIG. 3 is a schematic representation of a weight header stored for various rate structures in memory.

More particularly, the system directory table contains the starting addresses for common structured rate data. The system directory table includes starting addresses for the several different classes of service of mail available in the U.S. Postal System and the starting addresses for the several classes of delivery service provided by the U.S. Parcel Service. Each of the different rate structures is defined in terms of the weight of the parcels which may be mailed and in terms of dollar costs for mailing parcels of different weights. Generally speaking, the major rate structures are divided into one or more weight ranges, which taken together, span the distance between minimum and maximum allowable parcel weights for the rate structure. The general format of a weight header which would be stored in memory for each weight range within a major class of service is illustrated in FIG. 3. Each weight header includes three successive flag bytes in which the individual bytes ($B_0$–$B_7$) are used to define the meaning of other entries in the weight header. Except for the custom zip to zone memory means provided herein, a more detailed description of the general operation of the apparatus 10, its structure and its software is given in the aforementioned U.S. Pat. No.4,286,325. The disclosure of the structure, software and general operation as described in said patent are specifically incorporated herein by reference.

A postage computation routine is initiated after the scale means provides a digital indication of parcel weight and after an appropriate rate chart weight header has been identified. For parcels being mailed to a domestic destination, the appropriate weight header is determined by keyboard entries specifying the class of service to be employed; e.g. U.S. Postal Service first/priority mail, fourth class mail, United Parcel Service interstate mail, etc. The starting address of the appropriate rate chart is retrieved from a directory or look up table when the keyboard is read.

Figure 4:
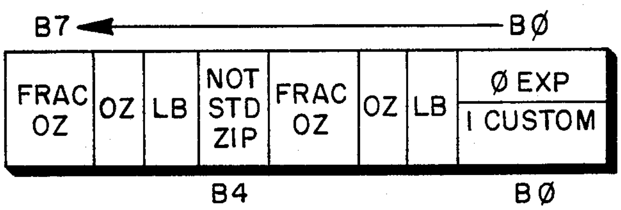
FIG. 4 is a schematic representation of a weight flag of the weight header of FIG. 3; and, FIG. 5 is a schematic representation of a storage arrangement in accordance with the subject invention.

FIG. 3 illustrates a weight header which is stored in memory for each weight range within a major class of service. For example, first/priority class service as well as fourth class service provided by the U.S. Postal System would each have one or more weight headers of the type shown as would the UPS interstate class of service. Each weight header includes three successive weight flag bytes in which the individual bits ($B_0$–$B_7$) are used to define the meaning of other entries in the weight header. In general, a first weight flag indicates parcel weight requirements for the weight header. The second weight flag which is illustrated in FIG. 4, includes information regarding the starting weight and the incremental entries for the header. Additionally, the second weight flag further indicates whether or not the present rate table employs standard/express zip to zone conversions or a custom zip to zone conversion. When bit B4 is set to a binary 0 standard zip to zone conversions are used in either U.S. Postal Service or UPS format. A binary 1 in bit B4 indicates employment of other than standard zip to zone U.S. Postal Service conversions. When B4 and B0 are each set to binary 0, the switch 31 is read to determine the PROM sector of storage means 22 in which the local standard conversion table is stored, the zip to zone conversion table is then located and a conversion routine is called. When a conversion routine is called, the apparatus automatically computes the zone value using the local zip conversion table identified by the setting of switch 31. In providing the standard zip to zone conversion, the addressed PROM sector is scanned until the zip code corresponding to the keyboard entry of the destination zip code is located. The zone associated with the destination zip which is retrieved is then utilized for further processing in the postage determination.

As indicated hereinbefore, each standard conversion table can require up to but generally less than 256 bytes and the approximately 600 existing conversion tables for the entire U.S. requires for example, about eighty two PROMS each having a storage capacity of two thousand words. In order to use the apparatus 10 at any zip code location in the U.S., information regarding the zip code of the apparatus location is entered by inserting the proper PROM memory in 22 and by manually setting the switch 31 which addresses one of the approximately twelve conversion tables in the first memory means 22.

In accordance with features of this invention, zone data for a particular service, such as fourth-class service, is automatically obtained from a custom zip to zone conversion table. The table includes data reflecting a cost variation, as for example the reduced cost of intra-BMC mailing. In operation, a user will make an entry at the keyboard of terminal 14 indicating fourth-class service is desired. The starting address of the appropriate fourth-class rate chart is automatically retrieved by the processor from a directory or look-up table when the keyboard entry is read. The second weight flag, illustrated in FIG. 4, will, when employed with a weight header for fourth-class service, exhibit binary 1 in bits B4 and B0 indicating a custom zip to zone conversion. Upon this indication, the program vectors to an illegal zip code table whose address is indicated by bytes in the header. These bytes comprise a 16 bit pointer 21 (FIG. 3) which indicates the location in memory of an illegal zip code table. It should be appreciated that an illegal zip code entry could be made. The program is directed to the addressed illegal zip code table in order to screen out illegal zip codes before proceeding with the actual conversion. The illegal zip code table addressed by the bytes 21 may be a custom illegal zip code table or a standard illegal zip code table. Upon detection of an illegal zip code entry, the apparatus provides an indication to the operator who can then correct the zip code entry. Upon detection of a legal zip code entry, a second 16 bit pointer 23 (FIG. 3) vectors to the custom zip to zone conversion table of the second memory storage means 24 for an originating zip code without further addressing and a custom zip to zone conversion routine is called. The addressed table memory sector is examined until the zone corresponding to the keyboard entry of the destination zip code is located. The zone associated with the destination zip code is retrieved and is then utilized for further processing in the postage determination. For fourth-class service, the zone which is retrieved is a customized reflection of U.S. postal service fourth-class service zone rates as modified to include rate reductions for intra-BMC mailings.

The second memory storage means 24 comprises one of a plurality of a set of alternative PROM memory storage members 32, each one of which is adapted to store data associated with a limited number of custom zip to zone conversion tables. FIG. 5 illustrates the apportionment in a memory storage member 32 of zip to zone conversion data. The storage member 32 in a particular example has an eight bit word (byte) and is adapted to store 4,096 such bytes. Storage member 32 is subdivided into a plurality of 16 sectors referenced by letters A–P, each of which comprises 256 bytes. Each sector stores a single, custom zip to zone conversion table for a particular, originating zip code location. One such storage member can thus provide custom zip to zone conversions for 16 different zip code locations. Other storage capacities can provide less or more sectors, but any such storage member will store less sectors than the existing number of conversion tables.

Unlike the first memory means 22 operating in conjunction with the switch means 31 which is initially read to determine the sector address of the appropriate conversion table, when a custom conversion table is indicated, the appropriate memory sector is directly addressed through a switch means 34. A sector for any particular zip code location is established by the manual switching means 34 which is preset to select one of the sectors. Referring now to FIG. 6, the storage member 32 which, for example, comprises a 4,096 word PROM is shown having 12 input address lines ($A_0$–$A_{11}$) and eight output data lines ($D_0$–$D_7$). The higher the input address lines ($A_8$–$A_{11}$) in combination are adapted to address one of the 16 memory sectors A–P (FIG. 5). Various combinations of binary inputs on these address lines ($A_8$–$A_{11}$), and, an associated sector which is addressed by a particular combination of binary ones and zeros is indicated in FIG. 5. Each of the higher order input address lines ($A_8$–$A_{11}$) is coupled via a resistive impedance to a potential $+E$. The switch means 34 comprises a plurality of manually operated switches 44–50, each of which is coupled to one of the input address lines ($A_8$–$A_{11}$) as shown. A first terminal of each of the switches 44–50 is coupled to ground potential and a second terminal is coupled to the associated input address line. By manually and selectively actuating the switches 44–50, the various binary combinations of FIG. 5 can be established at the input address line ($A_8$–$A_{11}$) and any particular sector A–P can thereby be selectively addressed. The switch means 34 is actuated to address one of the sectors A–P which stores the custom zip to zone conversion table data for the zip code locale at which the apparatus is located. The lower order address lines ($A_0$–$A_7$) will address individual bytes in the switch selected memory sector until a zone corresponding to a destination zip code is located. This addressing by the lower order address lines ($A_0$–$A_7$) is automatically accomplished as it was with a standard zip to zone conversion routine.

FIG. 7 illustrates a pluggable, demountable circuit board 52 on which the storage member 32 along with the switch means 34 is mounted. An exemplary form of the PROM storage member 32, without limitation, comprises a Texas Instrument 2532 PROM which has a storage capacity of 4,096 eight bit words. Other storage capacities less than that required to store all existing conversion tables can be provided. The memory address lines, output data lines, and operating potentials are coupled to the circuit board 52 via a terminal strip 54 which is adapted to couple to a connector 56 of the memory 16. When the storage member 32 comprises a TI-2532 PROM, it is adapted to store custom conversion tables for up to 16 geographic locations. A set of approximately 40 such storage members, each mounted as illustrated on a card as shown in FIG. 7, are provided and are alternatively mounted to connector 56 in order to provide the zip to zone conversion for the approximately 600 zip to zone conversion tables presently used in the United States. On initial use of the apparatus at a particular location, the user obtains and plugs to connector 56 a single card 52 having storage member 32 which includes in one of its storage sectors the custom zip to zone conversion table data for the geographic location of the apparatus.

There has thus been described an improved electronic mailing system which provides customized zip to zone conversion. While the customized zip to zone conversion has been described with respect to United States Postal Service fourth-class service, it can equally well be adapted for use with other services, such as United Parcel Service, and the like. The described invention is advantageous not only in providing a customized zip to zone service but in accomplishing the same relatively economically. The disclosed apparatus and method provide for storage of customized zip to zone conversion data in a single, directly-addressable, storage member adapted for storing conversion table data for a limited plurality of originating zip codes. This arrangement adapts existing electronic mailing system to customized variations occuring in a particular class of service and does so in a relatively noncomplex and economical manner. By providing for the use of a set of demountable, pluggable, alternative storage members, the on-hand storage requirements and the cost of providing customized zip to zone conversion is substantially reduced.

While there has been described a particular embodiment of the invention, it will be appreciated by those skilled in the art that variations may be made thereto without departing from the spirit of the invention and the scope of the appended claims.

What is claimed is:

1. An improved electronic mailing apparatus for indicating postage for a plurality of classes of postal service, said service having a number of standard zip to zone conversion tables, said apparatus comprising:

a. a scale means, a terminal means, a memory means and a processor means;

b. said processor means intercoupling said scale, terminal and memory means for providing an indication of postage for a parcel based on the weight of the parcel, class of service and destination zone;

c. said memory means including a first memory storage means for storing standard zip to zone conversion table data for originating zip code locations;

d. said memory means including a second memory storage means for storing custom data for a limited number of zip zone conversion tables less in number than the number of standard zip to zone conversion tables;

e. said custom zip to zone conversion table being based on distances, and modified to reflect a different rate structure when a destination zip location shares a common Bulk Mailing Center with the originating zip location; and, f. means for addressing a one of said limited number of zip to zone conversion tables.

2. The apparatus of claim 1 wherein said addressing means comprises a manually actuated switching means for selectively addressing one of said conversion tables.

3. The apparatus of claim 2 in which said second memory storage means provides a plurality of memory sectors, each of said memory sectors storing a custom zip to zone conversion table for a single originating zip code location and said manual switching means selects one of said sectors.

4. The apparatus of claim 3 wherein said second memory storage means comprises a storage member having a plurality of input address lines and said manually selectable switch means is coupled to higher order address lines for selecting one of a plurality of said sectors.

5. The apparatus of claim 4 wherein said storage member comprises a PROM having a plurality of storage sectors, each of said sectors storing at least 256 words, and said manual switching means selects one of said sectors.

6. The apparatus of claim 2 wherein said second storage means and said manually actuable switching means are supported on a demountable circuit board, said circuit board having a terminal for coupling to a connector.

7. An improved method for automatically determining the postage of a parcel comprising the steps of:

a. determining the weight of a parcel and providing an electrical indication thereof;

b. determining the class of postal service and providing an electrical indication thereof;

c. determining the destination zone of said parcel by searching a standard zip to zone conversion table in a first stored memory means when said postal service is of a first indicated class and alternatively, searching a custom zip to zone conversion table in a second stored memory means when said postal service is of a second indicated class;

d. said custom zip to zone conversion table being based on distance, and modified to reflect a different rate structure when a destination zip location shares a common Bulk Mailing Center with the originating zip location;

e. determining the postage for said parcel from said weight, class of service and destination zone; and, f. indicating the postage determined.

8. The method of claim 7 including the step of selectively and manually addressing one of a plurality of storage sectors, said addressed sector storing custom zip to zone conversion table data for the originating zip code area from which the parcel is being mailed.

9. The method of claim 8 in which said sector is manually addressed by selectively actuating a switching means.

10. An improved electronic apparatus for indicating postage for a plurality of classes of postal service comprising:

a. a scale means, a terminal means, a memory means and a processor means;

b. said processor means intercoupling said scale, terminal and memory means for providing an indication of postage for a parcel based on the weight of the parcel, class of service and destination zone;

c. said memory means including a first memory storage means for storing standard zip to zone conversion table data for domestic originating zip code locations;

d. said memory means including a second memory storage means comprising one of a plurality of alternative storage members;

e. said plurality of members storing custom zip to zone conversion data for each and every domestic originating zip code location;

f. said custom zip to zone conversion table being base on distances, and modified to reflect a different rate structure when a destination zip location shares a common Bulk Mailing Center with the originating zip location;

g. each one of said plurality of storage members storing custom data for a limited number of zip to zone conversion tables less than the number of standard zip to zone conversion tables;

h. said plurality of storage members alternatively and singularly employed with said apparatus to provide custom zip to zone conversion; and, i. means for addressing a one of said limited number of zip to zone conversion tables.

* * * * *